United States Patent [15] 3,688,272

Baumgartner [45] Aug. 29, 1972

[54] VISUAL INDICATION DEVICE IN WHICH A PART OF THE INDICATED DATA CAN BE CHANGED

[72] Inventor: Heinrich Baumgartner, Munich, Germany

[73] Assignee: Siemens Aktiengesellschaft, Berlin and Munich, Germany

[22] Filed: Sept. 3, 1970

[21] Appl. No.: 69,307

[30] Foreign Application Priority Data

Sept. 8, 1969 Germany..........P 19 45 412.7

[52] U.S. Cl...............................................340/172.5
[51] Int. Cl............................G06k 15/20, G06f 3/14
[58] Field of Search...................................340/172.5

[56] References Cited

UNITED STATES PATENTS

| | | | |
|---|---|---|---|
| 3,214,747 | 10/1965 | Lurie | 340/286 |
| 3,302,189 | 1/1967 | Korkowski et al. | 340/174 |
| 3,406,387 | 10/1968 | Werme | 340/324 |
| 3,413,610 | 11/1968 | Botjer et al. | 340/172.5 |

*Primary Examiner*—P. J. Henon
*Assistant Examiner*—Jan E. Rhoads
*Attorney*—Sherman, Meroni, Gross & Simpson

[57] ABSTRACT

Images are temporarily recorded on the screen of a cathode ray tube, the controlling data being produced by a keyboard type data generator and fed to a picture generator under the control of high speed timing pulses as opposed to image storage at a slower timing pulse rate, selection of storage or temporary recordation being effected by means of transfer switches.

5 Claims, 1 Drawing Figure

INVENTOR
Heinrich Baumgartner

BY Hill, Sherman, Meroni, Gross & Simpson ATTYS.

VISUAL INDICATION DEVICE IN WHICH A PART OF THE INDICATED DATA CAN BE CHANGED

BACKGROUND OF THE INVENTION

1. Field of the Invention

This invention relates to an arrangement for the indication of characters and visual images on the signal-storing picture screen of a cathode-ray tube, which has, besides a visual-indication device and a signal source, such as a keyboard or a data-processing device, means for the transformation of the digital signals into the ray movement, which means essentially comprises a picture-repetition storer, a character generator and a digital-analog converter.

2. Description of the Prior Art

Storing picture tubes in visual-data-indication devices where heretofore only suitable for the output. The digital signals, which are transmitted by a data-processing device, are converted, in a picture generator into the analog signal which corresponds to the character or curve shape, and in a processing device are processed to the storing picture tube. The storing picture tube stores the picture over a fairly long period of time, without the necessity of a regeneration. If a correction is to be done, the new picture content is to be transmitted in its entirety. The essential advantages of a visual-data-indication device with storing picture tube consists particularly in the fact that great amounts of data can be indicated, namely about 4,000 alphanumeric signs, since no picture repetition is necessary and thus the writing speed may be low. Such a visual-indication device, however, has the drawbacks that the data which is indicated on the picture screen cannot be sensed and transmitted any more and that the input and correction of data can only be effected via a data processing device. This results in a high demand on the data processing device and on the data transmission channels. An "off-line operation" thus is also not possible. These drawbacks are not shown with visual-data-indication devices of common construction with picture repetition and additional picture-repetition storer. They are well suited for the input and output of data, since the picture content can be corrected easily. The amount of data which can be indicated without flicker is limited, at the moment, to about 1,500 alphanumeric signs with a visual-data-indication device.

SUMMARY OF THE INVENTION

The invention has as its primary object the task of providing an arrangement in which great amounts of data can be indicated for a data output, and which provides the possibility of a data input in a local storer with the possibility of corrections.

This object is realized, according to this invention, in a way that two switches are provided and necessarily connected with each other for simultaneous operation. One of these switches in its first position, connects a data processing device with a visible-data-indication device, and, simultaneously, a picture generator is controlled via a second switch in its first position and with the help of a timing pulse generator in a way that the data which are transmitted by the data-processing device are recorded and stored on the storing picture tube of the visual-indication device. The first-mentioned switch, in its second position, connects a keyboard with the visual-indication device and, simultaneously, via the second-mentioned switch in its second position, the picture generator is controlled, with the help of the timing pulse generator, in a way that the data which is put into a picture-repetition storer with the help of the keyboard may be recorded on the storing picture screen of the visual-data-indicating device with sufficiently high speed and picture-changing frequency, so that they will not be stored there any more. In particular, it has been discovered that storing is not effected with prior storing picture tubes when a high writing speed is applied, but that a recordation on the picture screen is still possible.

An embodiment of the invention provides that, besides a switch for the switch-over from the input of the data, with the help of a keyboard, to the output of the data from a data-processing device, and another switch-over of the control of the picture generator, further switches are provided which are necessarily connected with each other, to either guide the data from a data-processing device and via a picture-repetition switch to a visible-data-indication device in a way that they are not stored there, or guide them directly to the visible-data-indication device for storage on the storing picture tube.

A further development of the invention consists in providing a switch at the outlet of the picture generator, so that the digital data signals which come from a data-processing device are selectively indicated either on the picture screen of a storing picture tube or on the picture screen of a non-storing picture tube, and the data which are fed in by means of a keyboard or a similar device, is only indicated on the picture screen of the non-storing picture tube.

The advantages which are obtained with the help of this invention reside particularly in that large amounts of data, about 4,000 alphanumeric signs can be indicated, since the data which are stored at the picture screen must not be repeated by a picture generator. Additional correctable data can be indicated in the amount which was possible hitherto with a visual-indicating device with picture repetition. The capacity of the picture-repetition storer is only to be limited to the variable data. With an arrangement according to this invention, the picture generator and the data-transmission devices are utilized two-fold. The measure to arrange a picture screen of prior art in addition to the storing picture screen offers the possibility to indicate the output from the data-processing device on both picture screens, and the input and correction only on one picture screen, namely the non-storing one. A typical case of application herefor is the inquiry operation. When the inquiry is placed into the picture-repetition storer, the indication is effected on the non-storing picture screen. The indication of the reply which is put out of the data-processing device is possible on both picture screens.

BRIEF DESCRIPTION OF THE DRAWINGS

Other objects, features and advantages of the invention, its organization, construction and operation will be best understood from the following detailed description taken in conjunction with the accompanying drawings, in which.

DESCRIPTION OF THE PREFERRED EMBODIMENTS

Figures 1, 2, 3:
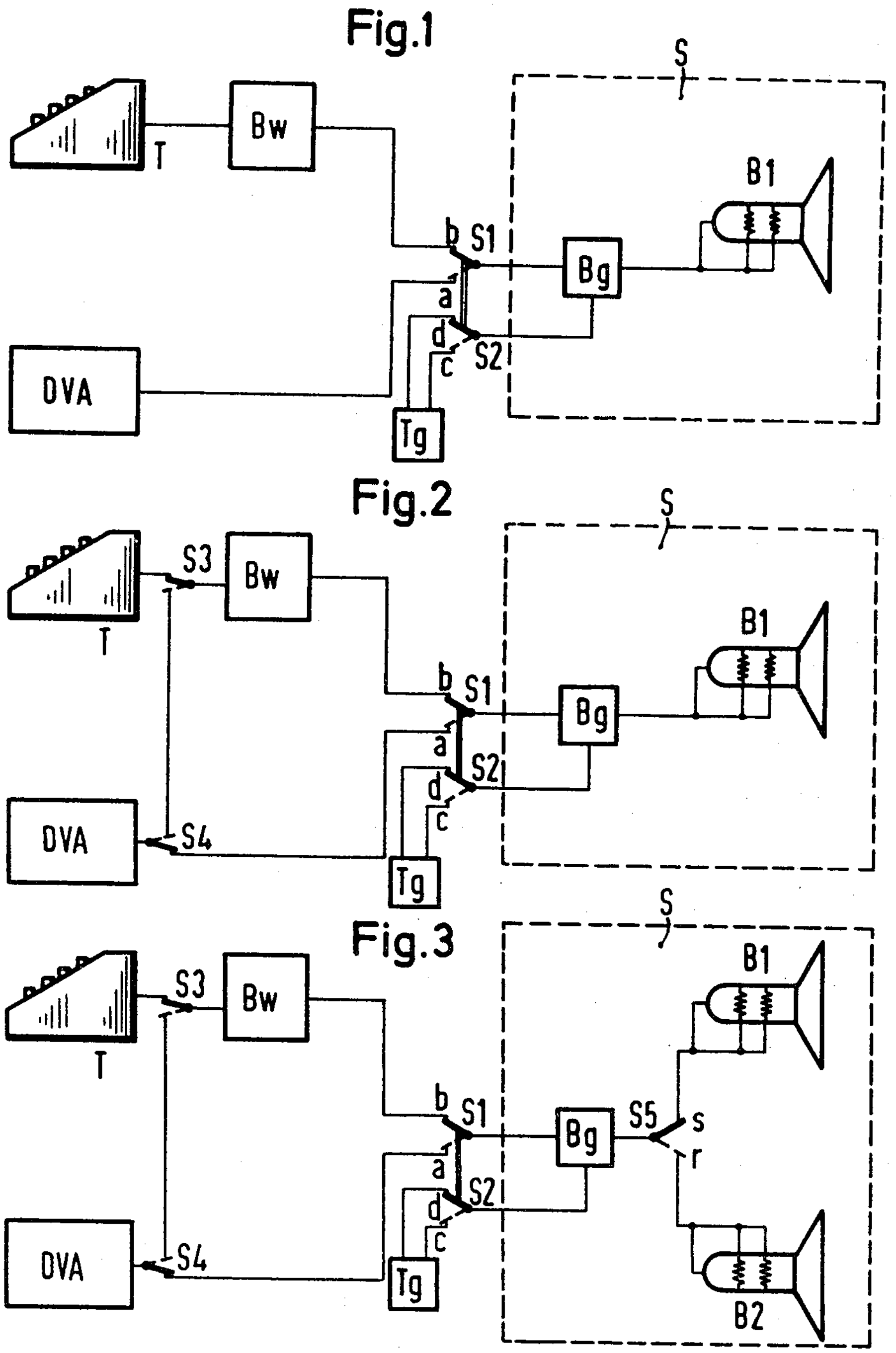
FIG. 1 is a schematic black diagram of a data system according to the invention.
FIG. 2 is a schematic black diagram of an embodiment of the invention which offers the possibility of selectively storing or not storing data at a picture screen which are sent from the data processing device.
FIG. 3 is a schematic block diagram of another embodiment of the invention which includes a non-storing picture tube in addition to a storing picture tube.

FIG. 1 shows the basic circuit diagram according to this invention. A switch S1 is provided which connects in its position *a* the data-processing device DVA with the visual-indication device S which comprises essentially a picture generator Bg and a picture tube B1. A switch S2 is necessarily connected with the switch S1, and the picture generator is controlled via this switch S2 by means of a pulse generator Tg. In the position *d*, the picture generator Bg is controlled in a way that it writes the data onto the storing-picture screen B1 of the visual-data-indication device S with sufficiently high speed and picture-changing frequency. In the position *c*, the picture generator Bg is controlled in a way that the data are written slowly onto the picture screen of the storing picture tube B1 and stored there. The data which are sent out by the data-processing device DVA, are written and stored on the visual-indication device S with the storing picture tube B1. The amount of data which can be brought to an indication on the picture screen B1, is very large, since the data do not have to be repeated by a picture-repetition storer Bw. This information from the data-processing device DVA cannot be read and corrected, but only eliminated in the whole. In the position *b*, the switch S1 connects, for instance, a keyboard T or a similar device with the visual-indicating device S. The data which are fed by means of a keyboard T, are written onto the picture-repetition storer Bw, and then written onto the picture screen of the storing picture tube B1 with such a high speed and such high picture-changing frequency, that the energy is not sufficient to activate the storage layer of the screen. This writing procedure is effected often enough so that a clearly visible picture will come about on the picture screen B1 which, however, is not stored. It is thus possible too, to indicate a stored and a not-stored picture on the picture screen B1 simultaneously. The data which are not stored at the picture screen B1 are easily correctable.

In FIG. 2, a sample embodiment of the invention has been illustrated which provides further switches S3 and S4 which are necessarily connected with each other besides the switch S1 for the switching over from the input of data to the output with the help of a keyboard T, and a switch S2 which is necessarily connected with it for the switching over of the control of the picture generator Bg. Thus, there is provided the possibility to guide the data from the data processing device DVA either to the visual-indicating device S with the storing-picture tube B1 via the picture-repetition storer Bw so that they are not stored at the storing-picture screen B1, or to guide them directly to the visual-data-indication device for storage on the storing-picture tube B1.

FIG. 3 shows an embodiment of the invention which contains a second, non-storing picture tube B2 in addition to the sample embodiment shown in FIG. 2. In a position *r* of the switch S5, the picture generator Bg is connected with the picture tube of the non-storing screen. The output of the data-processing device DVA can only be effected now on these two picture screens B1 and B2; and the input and correction, for instance, can only be effected on the non-storing picture screen B2 by means of a keyboard T. As a typical application for this embodiment, the inquiry operation can be provided. Thereby, the input of the inquiry is effected into the picture-repetition storer Bw with the help of the keyboard T. The indication is effected on the non-storing picture screen B2. The indication of the output of the data-processing device DVA, thus the answer, is possible on both picture screens B1 and B2.

The means for transforming digital signals into ray movement is well known in the art and may comprise, for example, a picture repetition storer, a character generator and a digital-analog converter. Also, the remaining equipments of the arrangement are known per se, the novel combination and improved interconnection and flexibility of the apparatus as a data indication system forming the basis of this disclosure.

Many changes and modifications may be made in the invention by one skilled in the art without departing from the spirit and scope of the invention, and it is to be understood that I intend to include within the patent warranted hereon all changes and modifications as may reasonably and properly be included within the scope of my contribution to the art. I claim:

1. An arrangement for displaying images comprising a visual data indicating device including a cathode ray tube having a storing type screen which does not require continuous picture regeneration for storage and a picture generator connected to said cathode ray tube and operable to control the display on said screen, a timing pulse generator having first and second outputs and operable to provide at respective outputs first timing pulses at a first rate and second timing pulses at a second rate higher than the first rate, a first data signal source, switching means connecting said first data signal source and said first output of said timing pulse generator to said picture generator to control the storage of an image on said screen, and a second data signal source, said switching means operable to transfer and selectively connect said second data signal source and said second output of said timing pulse generator to said picture generator in place of said first data signal source and said first output of said timing pulse generator to record but not store images on said screen.

2. An arrangement according to claim 1, wherein said switching means comprises a pair of mutually operable gauged transfer switches.

3. An arrangement according to claim 1, wherein said second data signals source comprises a keyboard type data generator and a picture repetition storer for storing the data produced by said data generator.

4. An arrangement according to claim 3, comprising second switching means for selectively disconnecting said first and second data signal sources from said switching means and said picture repetition storer respectively and connecting said first data signal source to said picture repetition storer for temporary image recordation.

5. An arrangement according to claim 1, comprising a second cathode ray tube having a second screen of the nonnstoring type and second switching means for selectively connecting either said first or second cathode ray tube to said picture generator.

* * * * *